(No Model.)
W. T. JOHNSON.
VEHICLE BRAKE.
No. 257,337. Patented May 2, 1882.
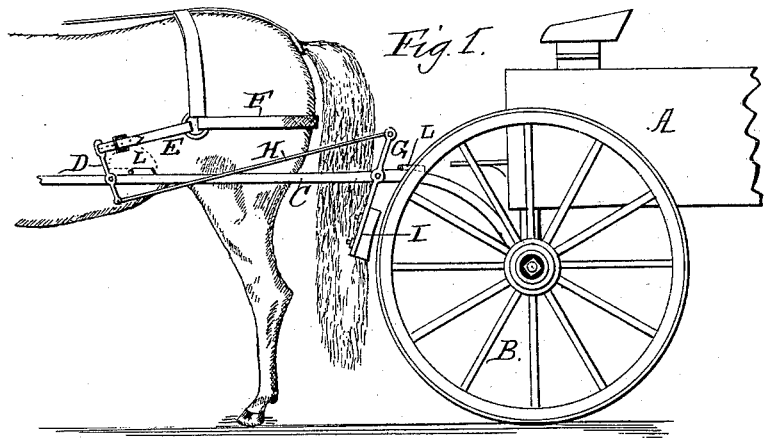
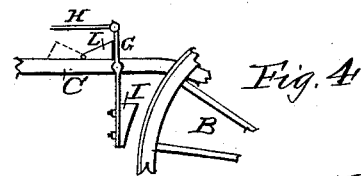
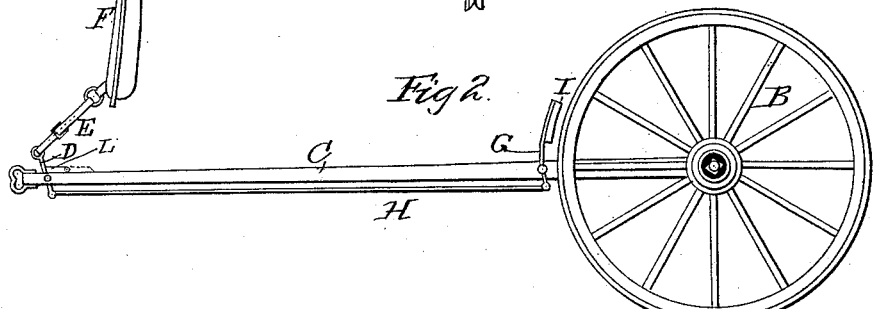
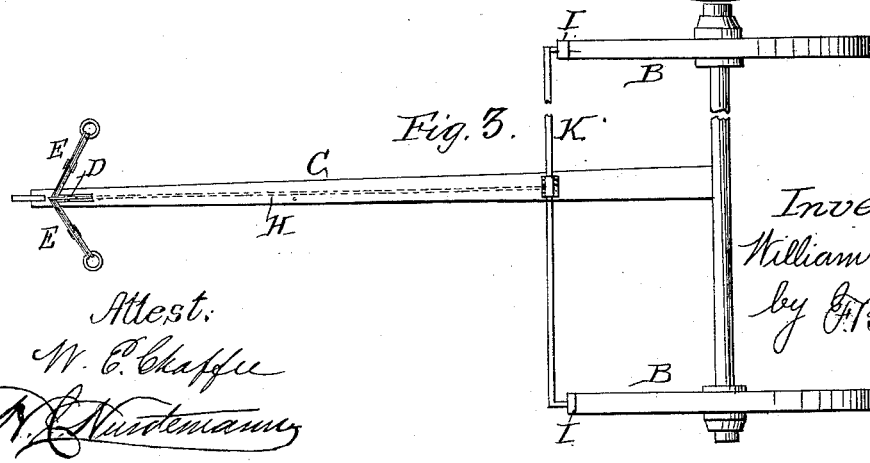
Attest:
W. E. Chaffee
N. L. Nurdemann
Inventor:
William T. Johnson
by F. B. Brock,
Atty.

UNITED STATES PATENT OFFICE.

WILLIAM T. JOHNSON, OF WASHINGTON, DISTRICT OF COLUMBIA, ASSIGNOR OF ONE-HALF TO CHARLES H. MILLER, OF EUREKA, ARKANSAS.

VEHICLE-BRAKE.

SPECIFICATION forming part of Letters Patent No. 257,337, dated May 2, 1882.

Application filed October 10, 1881. (No model.)

*To all whom it may concern:*

Be it known that I, WILLIAM T. JOHNSON, a citizen of the United States, residing at Washington, in the District of Columbia, have invented certain new and useful Improvements in Vehicle-Brakes; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification, in which—

Figure 1 represents a side elevation of a device embodying my invention as applied to a one-horse vehicle. Fig. 2 represents a side elevation of a device to which my invention has been applied, and which illustrates my improvement constructed and arranged for operation upon a two-horse vehicle; and Fig. 3 represents a top plan view of the same.

My invention relates to brakes for vehicles.

The object of my improvement is to provide for the automatic braking of a vehicle by means of the animal or animals drawing the same.

To effect this object my invention consists in the following construction and arrangement, whereby the object of my invention is effected, and which will be hereinafter fully described, and the points of novelty set forth in the claims.

My improved automatically-operating brake is designed more particularly for use upon roads built through rolling countries, and where the horse is required to draw the vehicle up and down grades. A vehicle in going downgrade exerts considerable force due to the momentum acquired by reason of the degree of incline, and which force differs according to the size and load carried thereby. Brakes heretofore constructed for arresting this force have been arranged for operation by hand or foot, and the intensity of the application has been mainly due to muscular effort on the part of the operator, and which, in a great many instances, has proved insufficient. The force and momentum of the load fall consequently upon the horse or horses, to their ultimate injury, besides unnecessarily obliging them to put forth strength which should be husbanded.

In my invention the power applied to set the brakes is derived from the motion of the vehicle against the horse in going downhill, through my improved devices. This force or power, which is so injurious to a horse in his efforts to restrain the force exerted by the wagon, is here utilized in such manner that the moment that such force is thrown against him it acts instantly to set the brakes in action to a degree proportioned to the force exerted by the wagon against the horse. The power thus required to set the brakes effectively in action is comparatively small and does not inconvenience the animal in the least. When the team reaches the bottom of the incline the vehicle ceases to exert itself against the horse and the brakes are taken off instantly.

From the above description it will be seen that the action of my improved brake is entirely automatic and requires no attention on the part of the driver, the brake being set in action when required, and also released. It also serves with good results in checking the too rapid gait of a horse. This is accomplished by giving a tension to the driving-reins sufficient to take up the tension of the tugs or traces, when the setting back of the horse in the harness will cause the brakes to come into action.

For a more detailed description of my invention reference is made to the accompanying drawings, in which the same letters of reference indicate the same parts.

A represents the body of a vehicle, and B one of its forward wheels.

C represents the shafts or thills broken away at their forward ends. At or about the point on the thills to which the holdback-strap is secured I provide a lever, D, preferably pivoted to the shafts or thills, so as to give a greater leverage to the upper arm, but which may be pivoted at any desirable point. The upper arm of this lever D is slotted or otherwise provided for the reception of the holdback-strap E of the harness F.

G represents the brake-shoe lever, which is also pivoted to the thills or pole in any suitable manner. A rod-connection, H, leading from the lower end of lever D to lever G, serves to link the two together, and through which the motion of lever D is imparted to lever G.

The brake-shoe I may be secured to the upper end of lever G, Fig. 2, or to the lower end of the same, Fig. 1, as may be deemed desirable.

In one-horse vehicles there are two sets of levers, D G, and their rod-connections H, the one attached to one thill and the other to the other thill, the holdback-straps on either side of the harness being suitably secured to the levers D D, respectively. In two-horse vehicles, Figs. 2 and 3, I have arranged the holdback-straps E so as to be secured to a single lever D, which is pivoted through a slotted opening at the end of the pole. A single rod-connection H secures the lever D to a single lever G, which in turn is connected to a transverse bar, K, carrying at each end a brake-shoe, for operation in the manner similar to that shown in Fig. 1.

If it should be found inconvenient to arrange the bar K as shown, it may be journaled between the forward and rear wheels on pendants from the wagon-body and the brake-shoes arranged to engage either the front or rear wheels, or both.

In Fig. 4 the brake-lever is shown pivoted in such a manner that the weight of the shoe has a constant tendency to keep the brakes off the wheels. Whenever the brakes are set the brake lever and shoe are thrown out of perpendicular, and whenever the brakes are off the brake-shoe I, by its gravity, returns the lever G again to its perpendicular position.

When it is desired to throw the brakes out of action, so that the team may be backed without setting the brakes, or where, for any reason, it is not desired to use the brakes, I provide a hinged block, L, preferably of triangular shape, as shown in Fig. 4; but other forms may be used similar to that shown in Figs. 1 and 2. A rod-connection may be also provided from the pivoted block shown in Fig. 4 to the other block on the opposite thill, with a lever-connection extending within reach of the foot of the driver, so as to be operated thereby.

As at present constructed, buggies and other light carrying-vehicles are not usually provided with brake apparatus; but it will be obvious that my improved brake is peculiarly adapted for such vehicles, especially when built for use over irregularly-lying country, the momentum of such vehicles when on a downgrade of any inclination at which it is practical to drive teams being almost, if not completely, neutralized.

Having described my invention, what I claim as new, and desire to secure by Letters Patent of the United States, is—

1. An automatic vehicle-brake consisting of the upright pivoted lever D, one arm of which is adapted to be secured to the holdback-strap E and the other to rod H, and the upright pivoted lever G, arranged on the shaft or pole in front of the wheel, and carrying the brake-shoe I at one end and connected at the other end to rod H, the whole arranged for operation and constructed to act in combination substantially as set forth.

2. An automatic vehicle-brake consisting of the upright lever D, shaft or pole C, upright lever G, carrying brake-shoe I, rod H, connecting levers D and G, and pivoted locking-block L, the whole constructed to act in combination substantially as set forth.

In testimony whereof I affix my signature in presence of two witnesses.

W. T. JOHNSON.

Witnesses:
M. FOLEY,
M. P. CALLAN.